United States Patent [19]

Verachtert

[11] 4,311,598
[45] Jan. 19, 1982

[54] DISINFECTION OF AQUEOUS MEDIA

[75] Inventor: Hubert Verachtert, Oud-Heverlee, Belgium

[73] Assignee: Interox Chemicals Limited, London, England

[21] Appl. No.: 174,631

[22] Filed: Aug. 1, 1980

[30] Foreign Application Priority Data

Sep. 4, 1979 [GB] United Kingdom ............... 30588/79

[51] Int. Cl.³ .......................... C02F 1/70; C02F 1/50
[52] U.S. Cl. ................................ 210/757; 210/759; 210/764; 424/130; 424/140
[58] Field of Search ............... 210/757, 759, 764, 763; 424/130, 140

[56] References Cited

U.S. PATENT DOCUMENTS

| | | | |
|---|---|---|---|
| 2,287,847 | 6/1942 | Webb | 424/130 |
| 2,902,400 | 9/1959 | Moudry | 210/764 |
| 3,065,139 | 11/1962 | Ericson | 424/130 |
| 3,200,069 | 8/1965 | Eisenhauer | 210/759 |
| 3,329,607 | 7/1967 | Colobert | 210/764 |
| 3,510,424 | 5/1970 | Zumbrunn | 210/759 |
| 3,681,492 | 8/1972 | Kotzbauer | 210/764 |
| 3,702,298 | 11/1972 | Zsoldos | 210/764 |
| 3,715,309 | 2/1973 | Zumbrunn | 210/759 |

FOREIGN PATENT DOCUMENTS

| | | | |
|---|---|---|---|
| 432101 | 7/1935 | United Kingdom | 424/130 |
| 446662 | 4/1936 | United Kingdom | 210/764 |

Primary Examiner—Ernest G. Therkorn
Attorney, Agent, or Firm—Larson and Taylor

[57] ABSTRACT

The present invention relates to processes and compositions for the disinfection of aqueous media and particularly bacteria-containing aqueous effluents, e.g. treated municipal sewage or effluents from paper or food-processing industries, employing hydrogen peroxide-containing compositions as an alternative to chlorine. Specifically, the disinfectant comprises a combination of hydrogen peroxide, a soluble copper salt such as copper sulphate and an autoxisable reducing agent such as ascorbic acid or sodium sulphite, which can be employed in dilute concentrations at pH from 6 to 9, preferably 6.5 to 8. Particularly preferred combinations of the components are of mole ratios 1:1 to 60:1 of hydrogen peroxide:copper: and 5:1 to 1:1.2 copper:reducing agent.

9 Claims, No Drawings

DISINFECTION OF AQUEOUS MEDIA

The present invention relates to processes and compositions for the disinfection of aqueous media.

Aqueous effluents in the untreated state can often contain high concentrations of bacteria, so that it is highly desirable that they be treated before being discharged into lakes and water-ways, the more so because such inland waters are being used for recreational purposes to an increasing extent. Chlorine has been employed as a bactericide, but there appears to be a risk that chlorine reacts to some extent with organic impurities in the treated water forming carcinogens such as chloroform. Since water commonly passes through the public supply after purification several times, there is naturally a desire not to introduce carcinogen-forming compounds with the result that alternatives to chlorine are being sought.

Hydrogen peroxide has been proposed as a bactericide and advantageously when it decomposes it yields oxygen and water, but it suffers from the disadvantage that by itself it is relatively inefficient.

According to the present invention there is provided a process for the disinfection of a bacteria containing aqueous medium comprising the step of introducing into the aqueous medium hydrogen peroxide to provide a concentration selected in the range of from $2.5 \times 10^{-6}$ M to $3 \times 10^{-3}$ M, a soluble copper salt in a concentration in the range of from $3 \times 10^{-6}$ M to $2 \times 10^{-5}$ M and an autoxidisable reducing agent in a concentration in the range of from $1 \times 10^{-6}$ M to $3 \times 10^{-5}$ M the concentration of copper and reducing agent being selected such that the mole ratio of copper to autoxidisable reducing agent is in the range of from 15:1 to 1:2.5, and maintaining the aqueous medium at a pH of from 6 to 9.

Desirably the components of the combination are present in mole ratios of hydrogen peroxide:copper in the range of 1:1 to 150:1. However, it would appear that the effect of varying the hydrogen peroxide to copper mole ratio is considerably more marked at the lower end of the pH range of 6 to 9 than at the higher end. Thus, we have found that when the aqueous medium is aproximately neutral or mildly acidic, i.e. in the range of 6 to 7.5 it is preferable to employ an hydrogen peroxide:copper mole ratio in the range of up to :1 and especially up to 60:1, is preferable to use a mole ratio of at least 5:1 and more preferably at least 10:1 hydrogen peroxide to copper. If less than the prefered range of peroxide:copper ratio is employed the effectiveness of the disinfectant is impaired whereas if significantly more than the prefered range of peroxide:copper ratio is employed a very marked reduction if effectiveness occurs. However, at slightly higher alkaline conditions, such as pH 7.5 to 8.5 the mole ratio of hydrogen peroxide:copper is less critical in that the broader range of 1 to 150:1 can be employed with advantage but again preferably up to 60:1, a particularly suitable range being from 1:1 to 20:1. Although a mole ratio of copper to reducing agent outside the range of 10:1 to 1:2 could be employed, the effectiveness of the disinfectant tends to be greater when the mole ratio employed is within the said range. Combinations in which the mole ratio of copper:reducing agent employed is in the range of from 5:1 to 1:1.2 are very suitable.

Preferably sufficient hydrogen peroxide is introduced to provide a concentration in the aqueous medium of at least $2.5 \times 10^{-5}$ M and in practice is unlikely to be greater than $2.5 \times 10^{-3}$ M. Frequently, its concentration is at least $1 \times 10^{-4}$ M and often no more than $7.5 \times 10^{-4}$ M. Desirably the copper is present in a concentration of at least $3 \times 10^{-6}$ M and usually in practice, not substantially more than $1.75 \times 10^{-5}$ M. The reducing agent is desirably present at a concentration of at least $1 \times 10^{-6}$ M and preferably up to $1 \times 10^{-5}$ M. The concentrations of the components within their ranges are selected in combination to obtain mole ratios falling within the above-mentioned ranges.

The soluble copper salt is conveniently copper sulphate but can be any other salt having a solubility sufficient to provide the aforementioned desired concentration of copper and as a guide any salt having a solubility of at least 5 gpl such as cupric acetate, chloride and nitrate has substantially greater than the minimum solubility. The reducing agent conveniently can be a polyhydroxy substituted arene such as 1,2,3-trihydroxy-benzene, or an aromatic aldehyde such as benzaldehyde or a readily oxidised hydroxy carboxylic acid or salt thereof such as dihydroxyfumaric acid, or compounds having a labile hydrogen atom such as malonic and ascorbic acid and salts thereof, or an inorganic agent such as an alkali metal sulphite.

Desirably, each of the components of the combination is introduced into aqueous medium in aqueous solution. In view of the interactive nature of the components it is desirable for them to be introduced either separately into the aqueous medium, or be mixed together shortly before introduction so as to reduce wasteful loss of reagents by reaction outside the aqueous medium. The concentrations of the various components in the aqueous solution introduced into the aqueous medium can be readily calculated to provide the desired mole ratio of components in the aqueous medium. By way of illustration, a mixture of equal volumes of 35% w/w hydrogen peroxide and of a solution containing 16 gpl copper sulphate (as $CuSO_4$) and another containing 10 gpl ascorbic acid has a mole ratio of approximately 40:1:0.36 of $H_2O_2$:Cu:reducing agent. If such a mixture were employed at a rate of 1 liter of mixture per 6000 liters of aqueous medium, the dosage would be approximately 20 ppm hydrogen peroxide and corresponding amounts of the other components. Naturally, if desired, the hydrogen peroxide solution can be subjected to an intermediate dilution before use in order to facilitate more accurate metering, especially when it is desired to employ it in a low mole ratio to the other components, for example less than 10:1:1. It will therefore be realised that commercially available hydrogen peroxide solutions containing from 5 to 80% hydrogen peroxide can be employed either as such or diluted and that in view of the large dilution that occurs upon use, there is no need to use the more concentrated solutions. As an alternative to using separate solutions, the two other components can be dissolved in appropriate amounts in the hydrogen peroxide solution, preferably without prolonged storage before use, or in the water used to dilute the hydrogen peroxide solution.

The combination of components forming the disinfectant of the present invention can suitably be applied to any aqueous effluent containing bacteria, and has particular application as a tertiary treatment of municipal sewage, i.e. a treatment subsequent to a secondary treatment of the activated sludge of trickling filter types and prior to discharge into water courses or reservoirs. Alternatively, the disinfectant can be employed on the effluents in the paper and food processing industries.

Advantageously, since the disinfectant functions at a pH on the range of 6 to 9, and especially in the range pH 6.5 to 8, the treated effluent can be discharged without any further adjustment to the pH. Conveniently the process according to the present invention can be effected at the natural temperature of the aqueous medium, which will be, in many cases, at a slightly higher than ambient. In practice the aqueous effluent is often retained in holding tanks prior to being discharged, the average residence time in the tanks being usually in the range of from 15 minutes to 2 hours. Mainly the temperature of the aqueous medium during the treatment according to the present invention will be in the range of ambient to 50° C.

Where the aqueous medium initially has a pH outside the selected range of pH 6 to 9, it can be treated by known methods such as with acid or alkali as is appropriate, to bring the pH within the selected range.

It will be recognised that the hydrogen peroxide can be generated in situ, if desired, by the use of such adducts as sodium percarbonate or sodium perborate. Alternatively, the hydrogen peroxide can either be replaced by a peroxyacid such as peroxyacetic or diperoxyisophthalic acid or employed in combination with an activator, i.e. a compound such as an anhydride or an N-acyl compound such as TAED which reacts with hydrogen peroxide to generate in situ a peroxyacid. Such activators have been disclosed particularly with respect to peroxyacid formation in aqueous low temperature washing or bleaching of fabrics. When the hydrogen peroxide is employed to generate peroxyacid or is replaced by it, the preferred mole ratio of active-oxygen-containing compound to copper in the combination tends to be lower than when hydrogen peroxide without activator is employed, and is often in the range of 1:5 to 25:1 moles especially 1:5 to 5:1 moles peroxyacid per mole of copper.

Various embodiments of the present invention will now be described more fully by way of Example.

In each of Examples 1 to 13 and to 22 and Comparisons C1 and C4 the aqueous medium to be disinfected was a sample of effluent withdrawn after the secondary treatment of municipal sewage which contained initially a mixture of the following microorganisms to a total count of $10^4$ to $10^5$ per ml:- Enterobacteriacaea, coliforms, faecial coliforms, D-Steptococcae, Staphylococcae, Micrococcae and aerobic and anaerobic spore-forming organisms such as Clostridium perfringens. The total count was obtained by innoculating plates of Tryptone Soya Agar with known volumes of sample, diluted when necessary, and incubating the plates at 37° C. for 48 hours. Unless otherwise stated, the effluent was treated at its natural pH which was within the range of pH 6.5 to 7.3.

A 100 ml sample of the effluent was dosed at ambient temperature with sufficient of each of the components of the disinfectant combination to provide the concentrations specified using hydrogen peroxide in Table 1 below in Examples 1 to 20 and a peroxyacid in the amounts specified in Table 2 below in Examples 21 and 22. The copper salt was copper sulphate and the reducing agent was as specified in Table 1 or 2. After a treatment of half an hour, the total bacteria count in the disinfected water was determined as before, using the method described above. In Table 1 the mole ratio is $H_2O_2$:Cu:Reducing Agent and % Survival is the % of bacteria surviving obtained by comparing the bacteria counts before and after the treatment.

Examples 1 to 5, 6 to 10, 11 to 13 and comparison C 14, Examples 15 to 20, and 21/22 form respectively groups of Examples, each group being carried out on different batches of effluent.

TABLE 1

| Ex No | $H_2O_2$ conc. (ppm) | Mole Ratio | Reducing Agent | pH | % Survival |
|---|---|---|---|---|---|
| C1 | 500 | — | — | — | 28.0 |
| 1 | 100 | 185:1:0.36 | Ascorbic acid | 7 | 38.0 |
| 2 | 20 | 37.0:1:0.36 | Ascorbic acid | " | 2.39 |
| 3 | 10 | 18.5:1:0.36 | Ascorbic acid | " | 2.39 |
| 4 | 1 | 1.85:1:0.36 | Ascorbic acid | " | 3.03 |
| 5 | 0.1 | 0.18:1:0.36 | Ascorbic acid | " | 3.38 |
| 6 | 100 | 185:1:0.36 | Ascorbic acid | 8 | 4.70 |
| 7 | 50 | 92.5:1:0.36 | Ascorbic acid | " | 0.98 |
| 8 | 20 | 18.5:1:0.36 | Ascorbic acid | " | 1.68 |
| 9 | 1 | 1.85:1:0.36 | Ascorbic acid | " | 1.52 |
| 10 | 0.1 | 0.18:1:0.36 | Ascorbic acid | " | 2.72 |
| 11 | 1 | 1.85:1:0.36 | Ascorbic acid | natural | 3.42 |
| 12 | 1 | 1.85:1:0.04 | Ascorbic acid | " | 7.15 |
| 13 | 0.1 | 0.18:1:0.36 | Ascorbic acid | " | 6.20 |
| C14 | 1 | 1.85:1:3.6 | Ascorbic acid | " | 36.7 |
| 15 | 10 | 18.5:1:0.36 | benzaldehyde | " | 2.73 |
| 16 | 10 | 18.5:1:0.36 | sodium sulphite | " | 1.38 |
| 17 | 10 | 18.5:1:0.36 | malonic acid | " | 2.01 |
| 18 | 10 | 18.5:1:0.36 | pyrogallol | " | 1.32 |
| 19 | 10 | 18.5:1:0.36 | Ascorbic acid | " | 1.32 |
| 20 | 20 | 37:1:0.36 | dihydroxy-fumaric acid | " | 0.04 |

In Table 1 the mole ratio is $H_2O_2$:Cu:Reducing Agent.

From Table 1 it can be seen that when the aqueous medium is approximately neutral it is especially desirable to employ a mole ratio of hydrogen peroxide:copper in the range of from about 45:1 to about 10:1 and that when a slightly more alkaline aqueous medium is treated, such as at pH 8, not only is a combination in the afore mentioned range at neutral pH effective, but a mole ratio of up to 100:1 of hydrogen peroxide:Cu can be equally or even more effective. Secondly it can also be seen from Example 11 to C 14 that a mole ratio of around 3:1 copper to reducing agent is especially effective. When that mole ratio was increased to nearly 30:1, there was some impairment of bactericidal effect but nowhere near as great an impairment as when the mole ratio was inverted to approximately 1:3.6, i.e. to the reducing agent being present in excess, as in comparison C 14.

In Table 2, the peroxyacid employed in Example 21 is peroxyacetic acid in Example 22 is diperoxyisophthalic acid.

TABLE 2

| Ex No | Peroxyacid Conc (ppm) | Mole Ratio Acid:Cu:Red Ag | Reducing Agent | pH | % Survival |
|---|---|---|---|---|---|
| 21 | 1 | 0.85:1:0.36 | Ascorbic Acid | natural | 2.0 |
| 22 | 1 | 0.32:1:0.36 | Ascorbic | nat- | 4.39 |

TABLE 2-continued

| Ex No | Peroxyacid Conc (ppm) | Mole Ratio Acid:Cu:Red Ag | Reducing Agent | pH | % Survival |
|---|---|---|---|---|---|
| | | | Acid | ural | |

In Examples 23 and 24 the aqueous medium to be treated was white water in the paper industry into which the disinfectant combination was introduced at the 12 hourly rate specified in Table 3. The total bacteria count was measured both before and after 6 and 24 hours treatment by the general method described for the preceeding Examples. In Table 3, the mole ratio is that of percompound:$Cu^{2+}$: Ascorbic Acid, and the percompound in Example 23 is hydrogen peroxide and in Example 24, diperoxyisophthalic acid.

TABLE 3

| Ex No | Percompound Conc (gpl) | Mole Ratio | % Survival after (hours) 6 | 24 |
|---|---|---|---|---|
| 23 | 20 | 37:1:0.36 | 2.1 | 5.0 |
| 24 | 20 | 6.4:1:0.36 | 0.4 | 4.9 |

I claim:

1. In a process for the disinfection of a bacteria-containing aqueous medium wherein hydrogen peroxide is introduced and the pH of the aqueous medium maintained at from pH 6 to 9, for subsequent discharge into water courses or inland waters, the improvement comprising the provision of hydrogen peroxide or peroxyacid in a concentration selected in the range of from $2.5 \times 10^{-6}$ M to $3 \times 10^{-3}$ M, together with a soluble copper salt in a concentration in the range of from $3 \times 10^{-6}$ M to $2 \times 10^{-5}$ M and an autoxidisable reducing agent in a concentration in the range of from $1 \times 10^{-6}$ M to $3 \times 10^{-5}$ M the concentrations of copper and reducing agent being so selected in combination that the mole ratio of copper to autoxidisable reducing agent is in the range of from 15:1 to 1:2.5 and the mole ratio of hydrogen peroxide to copper is in the range of from 1:1 to 60:1 or peroxyacid to copper is in the range of from 5:1 to 1:5.

2. A process according to claim 1 wherein the mole ratio of copper to autoxidisable reducing agent is in the range of from 5:1 to 1:1.2.

3. A process according to claim 1 employing hydrogen peroxide in a concentration of from $2.5 \times 10^{-5}$ M to $7.5 \times 10^{-4}$ M, the copper salt in a concentration of not more than $1.75 \times 10^{-5}$ M and reducing agent in a concentration of from $1 \times 10^{-6}$ M to $1 \times 10^{-5}$ M.

4. A process according to claim 1, 2 or 3 wherein the reducing agent is 1,2,3-trihydroxy-benzene, benzaldehyde, dihydroxyfumaric acid, malonic acid, ascorbic acid or an alkali metal sulphite.

5. A process according to any claim 1 wherein the copper salt is a copper sulphate.

6. A process according to claim 1 or 3 wherein the pH of the aqueous medium is maintained within the range pH 7.5 to 8.5.

7. A process according to claim 1 additionally employing an O-acyl or N-acyl compound in conjunction with the hydrogen peroxide to generate in situ a peroxyacid.

8. A process according to claim 7 wherein the peroxyacid is generated in a mole ratio to the copper of from 1:5 to 5:1.

9. A process according to claim 1, 3, or 7 wherein the aqueous medium is an aqueous effluent from the paper and food processing industries or from a sewage treatment works.

* * * * *